C. P. HOUSUM.
LADLES, &c.
No. 180,766.  Patented Aug. 8, 1876.
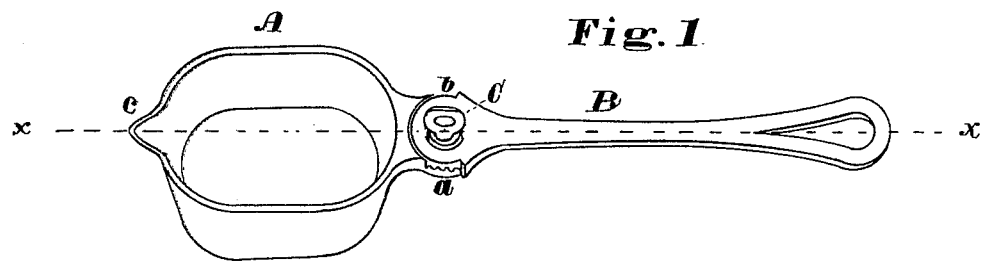
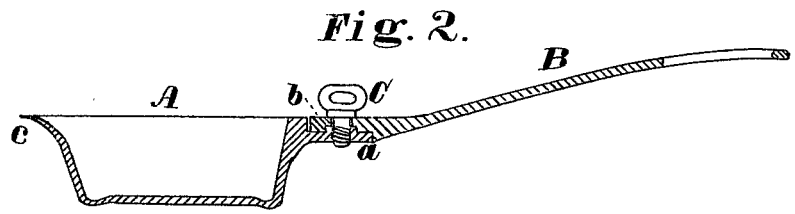
WITNESSES:
Chas M Fletcher
Jno. W. Lyon
INVENTOR:
Charles P. Housum

UNITED STATES PATENT OFFICE.

CHARLES P. HOUSUM, OF DECATUR, ILLINOIS.

IMPROVEMENT IN LADLES, &c.

Specification forming part of Letters Patent No. 180,766, dated August 8, 1876; application filed June 26, 1876.

*To all whom it may concern:*

Be it known that I, CHARLES P. HOUSUM, of Decatur, in the county of Macon and State of Illinois, have invented a new and useful Improvement in Ladles, &c., which improvement is fully set forth in the following specification, reference being had to the accompanying drawings.

My invention relates to an improvement in ladles, &c.; and consists of the pivoting of the handle to the bowl and providing the same with corrugated bearings, and securing the same together with a thumb-screw, so that the handle can be secured in a line with the spout, and at a right or any intermediate angle thereto.

Figure 1 is a perspective view of a ladle embodying my invention; and Fig. 2 is a transverse section on the dotted line $x$ $x$, Fig. 1.

A is the bowl, which may be made round, oval, or of any other shape desired; B, the handle. The handle and bowl are provided with the bearings $a$ $b$, corrugated, as shown, or they may be made without the corrugations. The corrugations insure a better means of securing and holding the bowl and handle together. A thumb-screw, C, secures the handle and bowl together, either threading the bearing on the handle or on the bowl, as shown; if in the handle, the thumb-piece will be below the handle.

Releasing the thumb-screw, the handle can be turned at a right or any intermediate angle to the spout $c$ and secured. A rivet may also be used instead of the thumb-screw, and by riveting loosely, so as to allow the corrugations to become disengaged, the handle may be turned, and when the bowl is filled the weight will cause the corrugations to engage, so that the handle will not turn.

This ladle will be found useful for melting sealing-wax for sealing cans, and especially for melting Babbitt metal, as the handle can be turned and the bowl introduced in among machinery to the boxes when a straight and fixed handle cannot be used.

I claim as my invention—

1. The pivoted and adjustable handle B, arranged as shown, so as to be secured in a line at a right or any other intermediate angle to the spout of the bowl, as and for the purpose set forth.

2. The bowl A, with bearing $a$, and handle B, with bearing $b$, with or without the corrugations, as and for the purpose set forth.

3. The thumb-screw C, in combination with the bearings $a$ $b$ on the handle B and bowl A, as and for the purpose set forth.

CHARLES P. HOUSUM.

Witnesses:
CHAS. M. FLETCHER,
JNO. W. LYON.